United States Patent [19]
Bleeke et al.

[11] Patent Number: 5,266,917
[45] Date of Patent: Nov. 30, 1993

[54] LINEAR MAGNETIC SENSING DEVICE

[75] Inventors: William F. Bleeke; John M. Kaste, both of Fort Wayne, Ind.

[73] Assignee: Xolox Corporation, Fort Wayne, Ind.

[21] Appl. No.: 790,414

[22] Filed: Nov. 12, 1991

[51] Int. Cl.⁵ .......................................... H01L 43/06
[52] U.S. Cl. ................................. 338/32 H; 335/302
[58] Field of Search .............. 338/32 H, 32 R; 29/607, 29/608; 148/101, 301, 302, 308; 324/326, 208, 207, 207.21; 335/209, 303, 304, 302

[56] References Cited

U.S. PATENT DOCUMENTS

| | | | |
|---|---|---|---|
| 3,911,429 | 10/1975 | Vinal | 340/365 L |
| 4,107,604 | 8/1978 | Bernier | 324/208 |
| 4,134,539 | 1/1979 | Hopkinson | 235/449 |
| 4,668,914 | 5/1987 | Kersten et al. | 324/208 X |
| 4,767,474 | 8/1988 | Fujimura et al. | 148/302 |
| 4,804,684 | 6/1989 | Fujimura et al. | 148/302 |
| 4,983,231 | 1/1991 | Yamanaka et al. | 148/301 |
| 5,006,806 | 4/1991 | Rippingale et al. | 324/326 |
| 5,017,873 | 5/1991 | Rippingale et al. | 324/326 |
| 5,100,604 | 3/1992 | Yamashita et al. | 264/115 |

Primary Examiner—Marvin M. Lateef
Attorney, Agent, or Firm—Barnes & Thornburg

[57] ABSTRACT

A magnet device having a predetermined field profile has an elongated permanent magnet, having a longitudinal axis and a peripheral surface, magnetized diametrically with the direction of magnetization extending transversely to the longitudinal axis and rotating about at least a portion of the length of the longitudinal axis of the magnet. The rate of rotation is selected to provide a predetermined magnetic field profile as presented to a Hall effect device positioned a fixed distance from the peripheral surface of the magnet when relative movement between the Hall effect device and the permanent magnet occurs. The magnet is formed of a composite material which includes a magnetically isotropic permanent magnet powder adhered together by an adhesive non-magnetic binder.

10 Claims, 4 Drawing Sheets

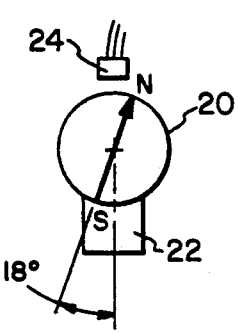 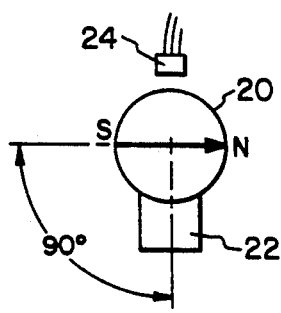 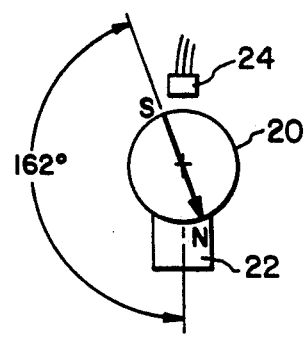
FIG. 3a   FIG. 3b   FIG. 3c
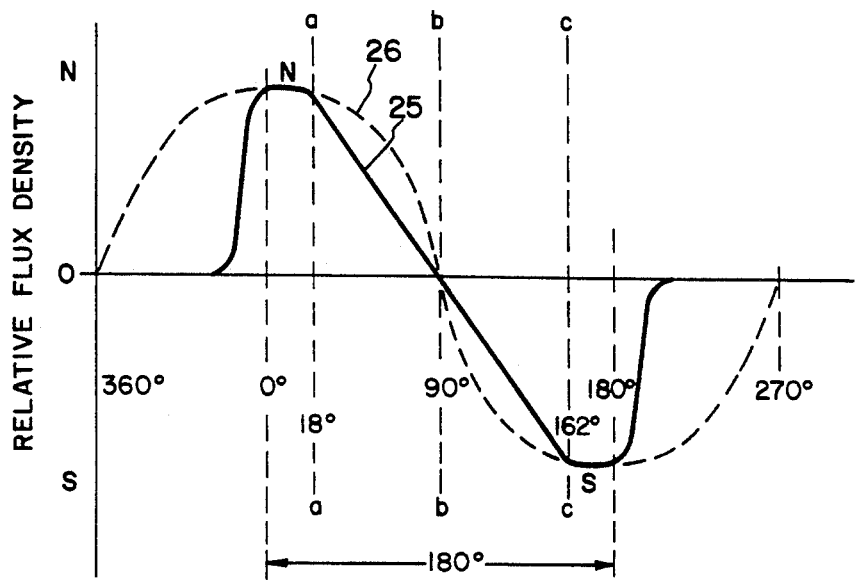
FIG. 4
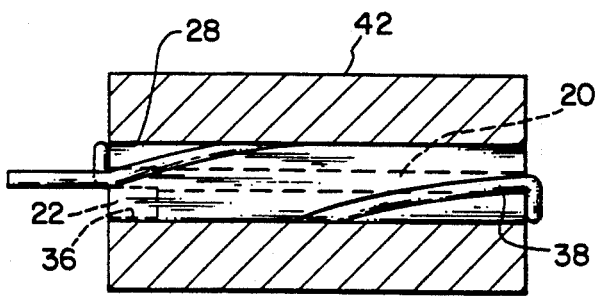
FIG. 7

5,266,917

LINEAR MAGNETIC SENSING DEVICE

BACKGROUND OF THE INVENTION

The present invention relates to a linear magnetic sensor for indicating the position of two relatively movable parts and more particularly to a sensing device comprising a bar magnet and a Hall effect device mounted a fixed distance apart but relatively movable with respect to each other.

As disclosed in U.S. prior art Pat. No. 4,107,604, a position-indicating device utilizes a Hall effect device and provides a predictable linear output. A magnet and Hall effect device are movably mounted in a fixed orientation such that they cannot shift or rotate relatively from the original pre-set position except for relative movement translationally in a given direction. It is stated that in this way variations in magnetic characteristics and hence variations in output from one application to another are eliminated. The magnet is in the form of an elongated bar which is magnetized from end-to-end, meaning that the North Pole is on one end and the South Pole on the other. Therefore, as the Hall effect device is moved parallel to the rod, it encounters strong fields of opposite polarities at the ends but a reduced field as the Hall effect device approaches the rod center.

It must be remembered that a Hall effect element is essentially a thin, planar structure which produces an output voltage proportional to magnetic flux normal to the plane thereof. Thus, as flux lines tend to approach a plane parallel to the Hall element, the output voltage substantially diminishes even to the point of zero volts relative to the offset voltage.

In this prior art device, since the field impinging the Hall element is not changed linearly as the element and magnet are moved relatively, the voltage output from the Hall element cannot be truly linear for any significant portion of the magnet's length.

SUMMARY OF THE INVENTION

The present invention comprises an elongated permanent magnet magnetized diametrically with the direction of magnetization being rotated end-to-end about the longitudinal axis of the magnet. The rate of such rotation is selected to provide a predetermined magnetic field profile, such as linear, as presented to a Hall effect device fixedly positioned with respect to the peripheral surface of the magnet but which is relatively movable axially of the magnet. The magnet is of a composite material which includes a powder of isotropic particles adhered together by an adhesive, non-magnetic binder.

It is known to mold such a magnet from a powder of anisotropic particles in an adhesive, non-magnetic binder, but is has been found that such a magnet does not provide the degree of smooth change or linearity required for a great many applications.

It is therefore an object of this invention to provide a magnet device having a predetermined field profile as presented to a relatively movable sensing device that is positioned a fixed distance from the magnet device.

Another object is to provide a magnet device in the form of a rod which is magnetized diametrically which is rotationally varied about the rod axis from end-to-end of the latter.

It is a further object to provide a sensing device that provides a linear variation in response to relative movement of a magnet and a sensor.

It is another object to provide an apparatus for magnetizing a rod magnet diametrically, which is rotationally varied about the rod axis from end-to-end.

It is still another object of this invention to provide an apparatus for magnetizing a rod magnet diametrically which is rotationally varied about the rod axis from end-to-end, the rate of rotation being such as presents a linear magnetic actuating field longitudinally thereof.

It is yet another object of this invention to provide a method for magnetizing the magnet of a linear-sensing device.

Other objects will become apparent as the description proceeds.

BRIEF DESCRIPTION OF THE DRAWINGS

FIGS. 3a, 3b and 3c are cross-sections of the embodiment of this invention but shown in diagrammatic form and are used in explaining the principles of this invention;

FIG. 4 is a graph used in explaining the principles of this invention;

FIG. 7 is a side view of the apparatus partially axially sectioned for clarity of illustration;

DESCRIPTION OF A PREFERRED EMBODIMENT

Figure 1:
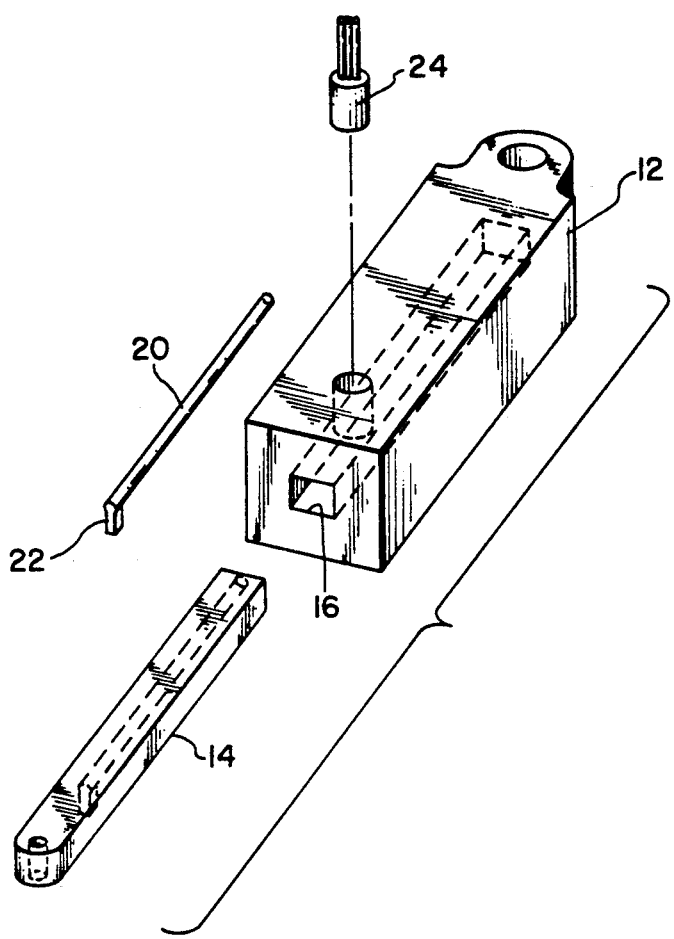
FIG. 1 is an exploded isometric view of one practical embodiment of this invention.
Figure 2:
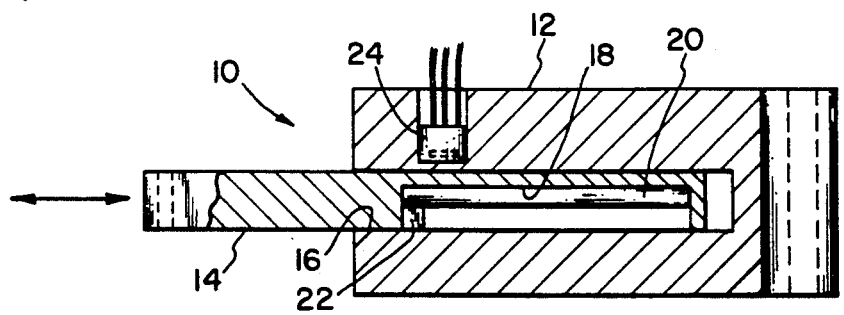
FIG. 2 is a longitudinal sectional view of the embodiment of FIG. 1.
Figure 3:
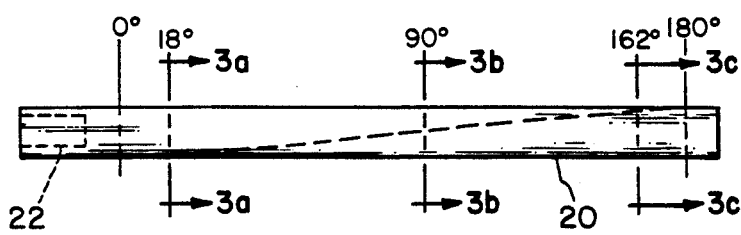
FIG. 3 is view of the rod magnet used in the embodiment of FIGS. 1 and 2, and is used in connection with explaining the features of the invention.
Figure 5:
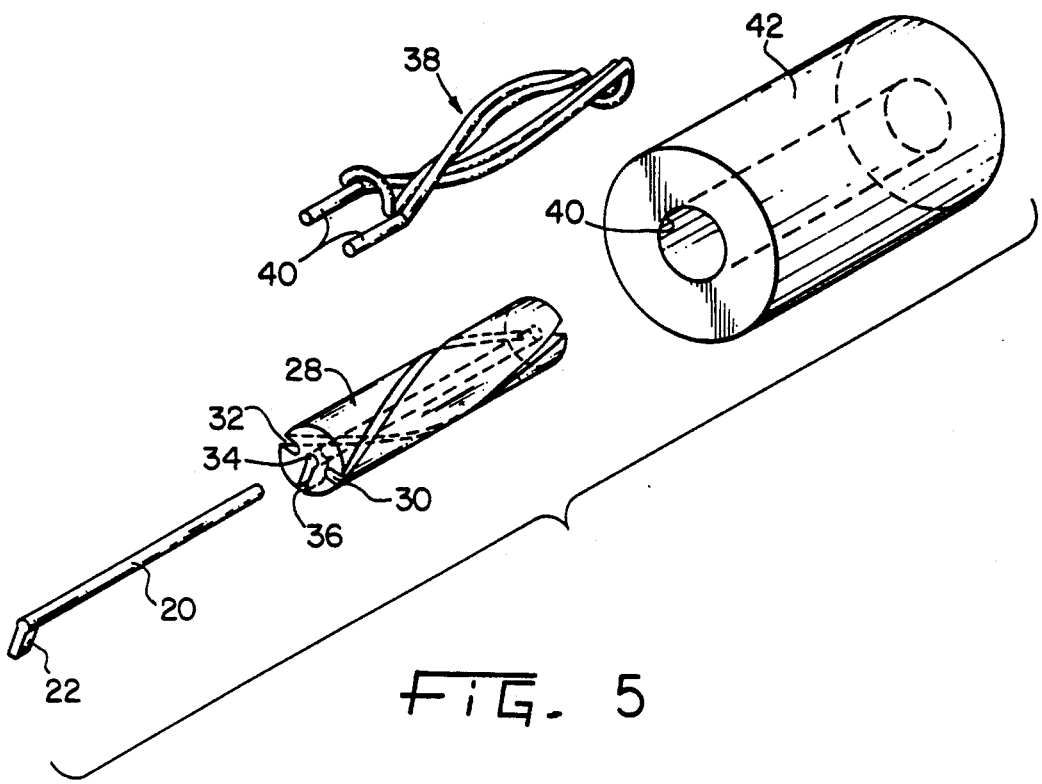
FIG. 5 is an exploded view of an apparatus for use in magnetizing the rod magnet of this invention.
Figure 6:
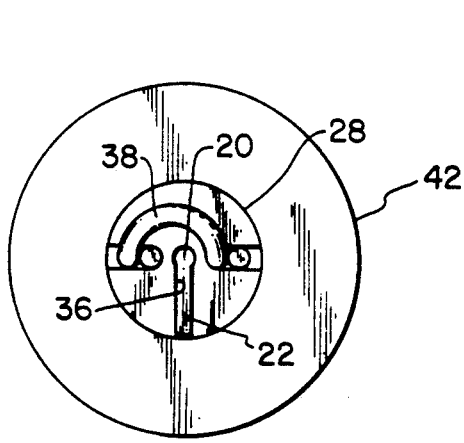
FIG. 6 is an end view thereof.

Referring to the drawings and more particularly to FIGS. 1, 2 and 3, a two-piece frame generally indicated by the reference numeral 10 is composed of two relatively slidable parts 12 and 14. The part 14 is received in a suitably shaped passage 16 in a frame part 12 for rectilinear reciprocation, the part 14 having an elongated recess 18 formed therein which receives a rod-like magnet 20 as shown in FIG. 2. The frame parts 12 and 14 are fabricated of non-magnetic material. The magnet 20 is suitably bonded in place. On one end of the magnet is provided a lateral protrusion 22 otherwise termed a "key." The key 22 used during magnetizing and mounting serves to orient the rod magnet 20 in its slot 18 and to hold it in this position.

A Hall device 24 is fitted into a suitable socket in the larger frame part 12 as shown immediately adjacent to the smaller frame part 14 and the rod-like magnet 20. Upon reciprocation of the smaller frame part 14 with respect to the larger part 12, the magnet 20 is carried rectilinearly past the Hall device 24.

Referring now to FIGS. 2, 3 and 4, the rod magnet 12 is preferably fabricated of a powder of some suitable plastic, such as nylon and isotropic magnetic powder molded into the shape shown. The magnet 20 is magnetized across its diameter with the diametral polarities being twisted from end-to-end of the magnet 20 as shown. This twist may be uniform or non-uniform end-to-end depending upon the longitudinal field profile desired. In the present embodiment, this twist is made non-uniform. Viewing FIGS. 3a, 3b and 3c, the cross-sections taken at section lines a—a, b—b, and c—c, have the diametral polarities angled as shown, all relative to the key 22. The rate of polarity twist longitudinally of the magnet 20 is otherwise controlled during magnetization of the rod 20 so as to provide a linear field change as graphically noted in FIG. 4 by the line 25 as sensed by the Hall device 24 when the frame part 14 is moved longitudinally the distance corresponding to the space between the two sections a—a and c—c of FIG. 3. It will be noted that midway between these two sections, that is at section line b—b, the field line 25 passes through zero gauss.

The rate of twist of magnetization is deliberately made nonuniform so as to provide the linear profile 25. However, if the twist is made uniform from end-to-end of the rod magnet 20, the field pattern would correspond in a general way to a section of a sine wave as indicated by the numeral 26. From this can be appreciated that the field pattern corresponding to the linear pattern 25 can be made to many other shapes such as logarithmic. The apparatus for magnetizing the rod 20 will now be described.

A magnetizing fixture is shown in FIGS. 5-8. A cylindrical electromagnet is composed of a steel cylinder 28 having two diametrically opposed slots 30 and 32 which follow a twist pattern from end-to-end of the cylinder 28. The cylinder 28 is also provided with an axial, central bore 34 sized to slidably receive the rod 20. A radial cavity or receptacle 36 is cut through the end of the cylinder 28 and has its sides spaced apart sufficiently to receive slidably the key 22 thereby rotationally orienting the magnet 20 within the cylinder 28.

Figure 8A:
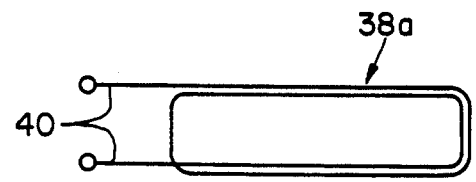
FIGS. 8a and 8b are diagrammatic illustrations used in explaining the electromagnet coil of the preceding apparatus.
Figure 8B:
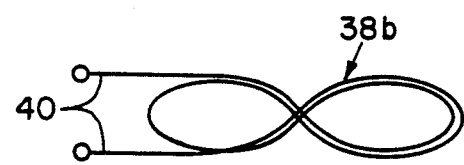

A magnetizing coil containing two turns of number 10 wire, for example, as indicated by the numeral 38, is wound in the two slots 30 and 32 with terminal leads 40 extending from the ends thereof. In further explanation of the construction of this coil, reference may be had to FIGS. 8a and 8b wherein the FIG. 8a shows a two-turn coil elongated to pass around the longitudinal extent of the cylinder 28. Such a coil would provide a magnetic field that provides a longitudinally straight line pattern transverse to the axis of the cylinder 28. However, if this coil 38a is twisted approximately 180° as shown by the numeral 38b, it will be understood that the field pattern will have a corresponding twist longitudinally of the cylinder 28. If this twist 38b is uniform from end-to-end, then the magnet 20 would be magnetized to produce a substantially sinusoidal field pattern from end-to-end. However, in order to obtain the desired linear pattern, this twist is made to be non-uniform according to a rate determined by calculation utilizing a sine function and compensating for "end effects" calculated by current sheet theory.

The electromagnet 28 is slidably received by a companion bore 40 in a cylindrical member 42 of steel which serves to provide a flux return path for the magnetizing process. By applying a suitable unidirectionally potential to the terminal leads 40, a magnetizing field is applied to the rod 20 which magnetizes the same according to the desired field pattern.

Returning now to the sensing device shown in FIGS. 1 and 2, as the frame part 14 is moved within the passage 16, the field applied to the Hall device 24 will correspondingly change and thereby provide an output voltage from the Hall device which is of a corresponding analog value. In other words, if the Hall device 24 is also linear in its performance, the application of a moving magnetic field which is linear will provide a linear voltage output from the Hall device.

The rod 20 is preferably molded, the constituents being a powder of magnetically isotropic material and a suitable plastic binder such as nylon. In particular isotropic material found suitable is a neodymium-iron-boron powder, MQP-B, sold by General Motors Corp., Magnaquench Division. This is generally referred to in the following as neodymium. The neodymium powder is truly isotropic, and while this particular material is specified as being preferred, it is to be understood that other isotropic, powder materials will also work. In the preferred embodiment, 60% of the neodymium material by volume is used with 40% of nylon powder by volume. The powder material after being thoroughly mixed and compounded, is fed to a molding machine and the rod 20 with the key 22 are molded. The resulting rod magnet is thus also isotropic and achieves uniform magnetic powder distribution.

Figure 9:
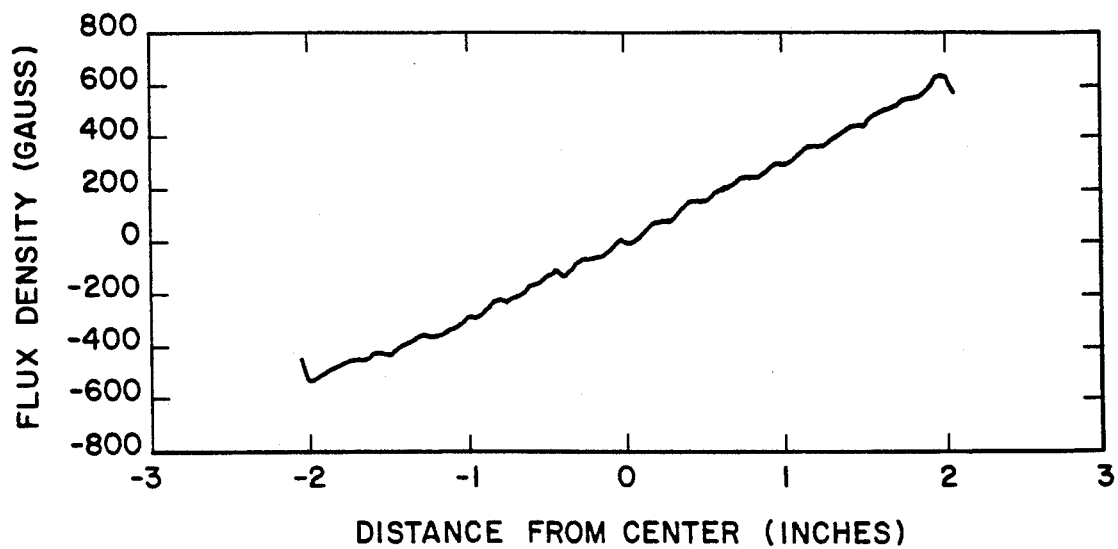
FIG. 9 is a graph used in explaining the principles of this invention.

Care must be taken in selecting the magnetic powder. It is known to fabricate such a rod of a powder which is anisotropic, barium ferrite and samarium cobalt being examples. The individual particles making up these powders have preferred directions of magnetization and also have shapes which are essentially the same so that upon molding the rod, particles will tend to be positioned in groups, some in parallelism and others at random. The resulting field profile contains irregularities due to the preferred axes of these powders not being truly randomly oriented. The desired linearity or smooth change cannot be obtained. In the present invention, it is a requirement that there can be no more than 5% variation in field linearity. FIG. 9 illustrates graphically the rough or irregular field profile that results from the use of anisotropic samarium cobalt magnet powder. Following the principles of this invention, the bumps and irregularities are smoothed over thereby to provide a more uniform profile.

With respect to the degree of twist designed into the shape of the two turn coil 38, the data shown in the following chart is utilized for the purpose of generating the linear profile 25 of FIG. 4. While this data will change depending upon materials used, as well as sizes and shapes of the components, one set of data is given in the following for a rod 20 which is one-eighth of an inch in diameter and 4.2 inches long plus the length of the key 22. The data is given in two columns, the column on the left indicating the distance from the rod center, midway between the ends, and the right-hand column giving the angular rotation of twist in the magnetizing coil 38 in degrees as measured longitudinally outwardly from the rod center. The result as shown in FIG. 4 would provide a linear profile of about four inches (4") between the points "a" and "c."

| DISTANCE FROM CENTER (INCH) | ANGULAR ROTATION IN DEGREES |
|---|---|
| 0.000 | 0.000 |
| 0.020 | 0.573 |
| 0.041 | 1.146 |
| 0.061 | 1.719 |
| 0.082* | 2.292 |
| 0.102* | 2.866 |
| 0.123* | 3.440 |
| 0.143** | 4.014 |
| 0.164** | 4.588 |
| 0.184** | 5.163 |
| 0.205*** | 5.739 |
| 0.225*** | 6.315 |
| 0.246*** | 6.892 |
| 0.266**** | 7.469 |
| 0.286**** | 8.047 |
| 0.348***** | 9.787 |
| 0.368***** | 10.369 |
| 0.389****** | 10.951 |
| 0.409****** | 11.535 |
| 0.430****** | 12.120 |
| 0.450******* | 12.707 |
| 0.471******* | 13.295 |
| 0.491******* | 13.884 |
| 0.512******** | 14.474 |
| 0.532******** | 15.066 |
| 0.552******** | 15.660 |
| 0.573********* | 16.255 |
| 0.593********* | 16.852 |
| 0.614********* | 17.451 |
| 0.634********** | 18.052 |
| 0.655********** | 18.655 |
| 0.675********** | 19.260 |
| 0.696*********** | 19.867 |
| 0.716*********** | 20.477 |
| 0.737*********** | 21.089 |
| 0.757************ | 21.703 |
| 0.777************ | 22.319 |
| 0.798************ | 22.939 |
| 0.818************* | 23.561 |
| 0.839************* | 24.186 |
| 0.859************* | 24.814 |
| 0.880************** | 25.445 |
| 0.900************** | 26.079 |
| 0.921************** | 26.716 |
| 0.941*************** | 27.357 |
| 0.962*************** | 28.002 |
| 0.982*************** | 28.650 |
| 1.003**************** | 29.302 |
| 1.023**************** | 29.958 |
| 1.043**************** | 30.618 |
| 1.064***************** | 31.282 |
| 1.084***************** | 31.950 |
| 1.105***************** | 32.624 |
| 1.125****************** | 33.302 |
| 1.146****************** | 33.984 |
| 1.166****************** | 34.672 |
| 1.187******************* | 35.366 |
| 1.207******************* | 36.064 |
| 1.228******************* | 36.769 |
| 1.248******************** | 37.479 |
| 1.269******************** | 38.195 |
| 1.289******************** | 38.918 |
| 1.309********************* | 39.647 |
| 1.330********************* | 40.383 |
| 1.350********************* | 41.126 |
| 1.371********************** | 41.876 |
| 1.391********************** | 42.634 |
| 1.412********************** | 43.400 |
| 1.432*********************** | 44.173 |
| 1.453*********************** | 44.955 |
| 1.473*********************** | 45.745 |
| 1.494************************ | 46.544 |
| 1.514************************ | 47.352 |
| 1.535************************ | 48.169 |
| 1.555************************* | 48.995 |
| 1.575************************* | 49.830 |
| 1.596************************** | 50.674 |
| 1.616************************** | 51.527 |

| DISTANCE FROM CENTER (INCH) | ANGULAR ROTATION IN DEGREES |
|---|---|
| 1.678 | 54.138 |
| 1.698 | 55.022 |
| 1.719 | 55.912 |
| 1.739 | 56.804 |
| 1.760 | 57.696 |
| 1.780 | 58.585 |
| 1.800 | 59.466 |
| 1.821 | 60.334 |
| 1.841 | 61.180 |
| 1.862 | 61.998 |
| 1.882 | 62.780 |
| 1.903 | 63.521 |
| 1.923 | 64.225 |
| 1.944 | 64.917 |
| 1.964 | 65.670 |
| 1.985 | 66.668 |
| 2.005 | 68.373 |
| 2.026 | 72.147 |
| 2.046 | 90.000 |
| 2.066 | 107.853 |
| 2.087 | 111.627 |
| 2.107 | 113.332 |

With respect to operation of the working embodiment of FIGS. 1 and 2, it will be noted that the Hall element in the Hall device 24 is a platelet that is positioned parallel to the axis of the rod 20 and is laterally centered with respect thereto with a fixed distance from the periphery of the rod 20. The platelet thus positioned is able to measure flux density for lines of flux whose vector component is normal to the axis of the rod and in a fixed angular relationship to the key 22. The point "a" on the rod (FIG. 3) is so selected to provide a maximum field within the linear region at which point the flux lines are about 18° off normal to the Hall platelet. The voltage output of the Hall platelet will thus be maximum within the operative range. As the rod 20 is translationally moved relative to the platelet, the vectors of the flux lines incident on the platelet will change until the rod center at position "b" is opposite the platelet. In this position, the flux lines are essentially parallel to the platelet whereupon the Hall device 24 is unable to measure any flux density. As the rod is continued in its movement toward the point "c," the flux lines incident on the Hall platelet correspondingly change angle to become more normal until the point "c" is reached, the magnitudes of the vectors normal to the Hall device at points "a" and "c" being equal with the polarities being opposite.

With the rod 20 so magnetized, and the Hall device 24 maintained with a fixed air gap, flux density measured by the Hall device 24 will be linear between the positions "a" and "c" in the rod.

While there have been described above the principles of this invention in connection with a specific device, it is to be clearly understood that description is made only by way of example and not as limitation to the scope of the invention.

What is claimed is:

1. A magnet device having a predetermined magnetic field profile comprising a permanent magnet rod, having a longitudinal axis and a peripheral surface, said rod being magnetized diametrically, wherein the direction of magnetization extends transversely to the longitudinal axis and rotates about at least a portion of the length of the longitudinal axis of the magnet, the rate of such rotation being selected to provide a predetermined magnetic field profile as presented to a Hall effect device, when relative movement in the direction of the longitudinal axis of the rod occurs between the Hall effect device and the magnetized rod.

2. The magnet device of claim 1 wherein said predetermined field as presented to the Hall effect device is linear.

3. The magnet device of claim 2 including means for supporting said magnet for translational movement axially thereof.

4. The magnet device of claim 3 including means for securing said Hall effect device in the position aforesaid.

5. The magnet device of claim 4 wherein said magnet is made of a composite material which includes magnetically isotropic permanent magnet powder adhered together by an adhesive non-magnetic binder, and wherein the isotropic powder contains neodymium, the binder contains nylon, the ratio of isotropic powder to binder being about sixty percent by volume of isotropic powder and forty percent by volume of binder, and said magnet being of circular cross-section.

6. The method of fabricating a permanent magnet having a longitudinal axis, a peripheral surface and a predetermined magnetic field profile comprising the steps of forming a rod-like element of permanent magnet material which includes an isotropic powder and a plastic binder, and magnetizing said rod-like element diametrically with a predetermined twist so that the direction of magnetization, relative to a fixed point adjacent the peripheral surface, rotates in a predetermined manner at least a portion of the length of the longitudinal axis of the permanent magnet as the magnet moves relative to said point.

7. The method of claim 6 wherein said forming step includes molding said rod, said isotropic powder contains neodymium, and said binder containing nylon.

8. The magnetic device of claim 1, wherein the Hall effect device is disposed adjacent the peripheral surface of the magnetized rod so as to lie a constant distance therefrom.

9. A permanent magnet for use with a device which produces a signal which varies in response to a changing magnetic field, said permanent magnet comprising:

an elongate body having a longitudinal axis and a peripheral surface, wherein said body is magnetized transversely relative to said axis along at least a portion of the length of the body and wherein the direction of magnetization rotates along that portion of the length of the body so as to cause the device to produce a signal having a desired characteristic shape in response to relative longitudinal movement between the magnet and the device.

10. The permanent magnet of claim 9, wherein the device is a Hall effect device.

* * * * *